United States Patent [19]

White

[11] Patent Number: 5,285,205
[45] Date of Patent: Feb. 8, 1994

[54] LASER GUIDED VEHICLE POSITIONING SYSTEM AND METHOD

[76] Inventor: Bernard H. White, 3304 Grennoch, Houston, Tex. 77025

[21] Appl. No.: 553,185

[22] Filed: Jul. 16, 1990

[51] Int. Cl.$^5$ .............................................. B60Q 1/48
[52] U.S. Cl. .................... 340/932.2; 33/264; 340/435; 340/958; 356/399
[58] Field of Search ............... 340/958, 932.2, 933, 340/942, 943, 903, 435, 436; 342/23, 54; 455/609; 356/399, 401, 397, 398; 116/28 R; 33/264, 286; 353/11

[56] References Cited

U.S. PATENT DOCUMENTS

| | | |
|---|---|---|
| 2,818,553 | 12/1957 | Jaffe . |
| 3,493,925 | 2/1970 | Brancale . |
| 3,674,226 | 7/1972 | Wasson . |
| 3,707,330 | 12/1972 | Pine ................................. 356/401 |
| 3,729,262 | 4/1973 | Snead et al. . |
| 3,775,741 | 11/1973 | Zechnowitz et al. .............. 340/958 |
| 3,859,732 | 1/1975 | Davin ................................. 33/264 |
| 3,910,533 | 10/1975 | Cheatham et al. ................. 33/286 |
| 4,249,159 | 2/1981 | Stasko . |
| 4,405,204 | 9/1983 | Saint-Sevin et al. .............. 356/399 |
| 4,552,376 | 11/1985 | Cofer ................................. 33/264 |
| 4,665,378 | 5/1987 | Heckethorn ..................... 340/686 |
| 4,703,820 | 11/1987 | Reinaud . |
| 4,764,983 | 8/1988 | Walter .............................. 455/609 |
| 4,808,997 | 2/1989 | Barkley et al. . |
| 4,813,758 | 3/1989 | Sanders . |
| 4,815,845 | 3/1989 | Colbaugh et al. ................. 356/399 |
| 4,844,681 | 7/1989 | Pierre et al. ....................... 356/399 |
| 4,941,263 | 7/1990 | Hirshberg ......................... 340/435 |

OTHER PUBLICATIONS

Edmund Scientific Company's "1989 Annual Reference Catalog for Optics, Science and Education", pp. 101, 112 and 115.

Primary Examiner—Brent Swarthout
Attorney, Agent, or Firm—Yale S. Finkle

[57] ABSTRACT

A vehicle guidance and positioning system utilizing a laser, the emitted beam from which is directed over the path along which a vehicle is to be guided. The laser beam impinges on a target area located on the vehicle in such a manner that the impingement of the laser beam on the target is continuously observable by the vehicle's operator. The operator steers the vehicle so that the laser beam continuously impinges on the target area until the vehicle reaches a preselected position in a confined space such a garage, a drive-through service lane, a loading dock and the like.

25 Claims, 2 Drawing Sheets

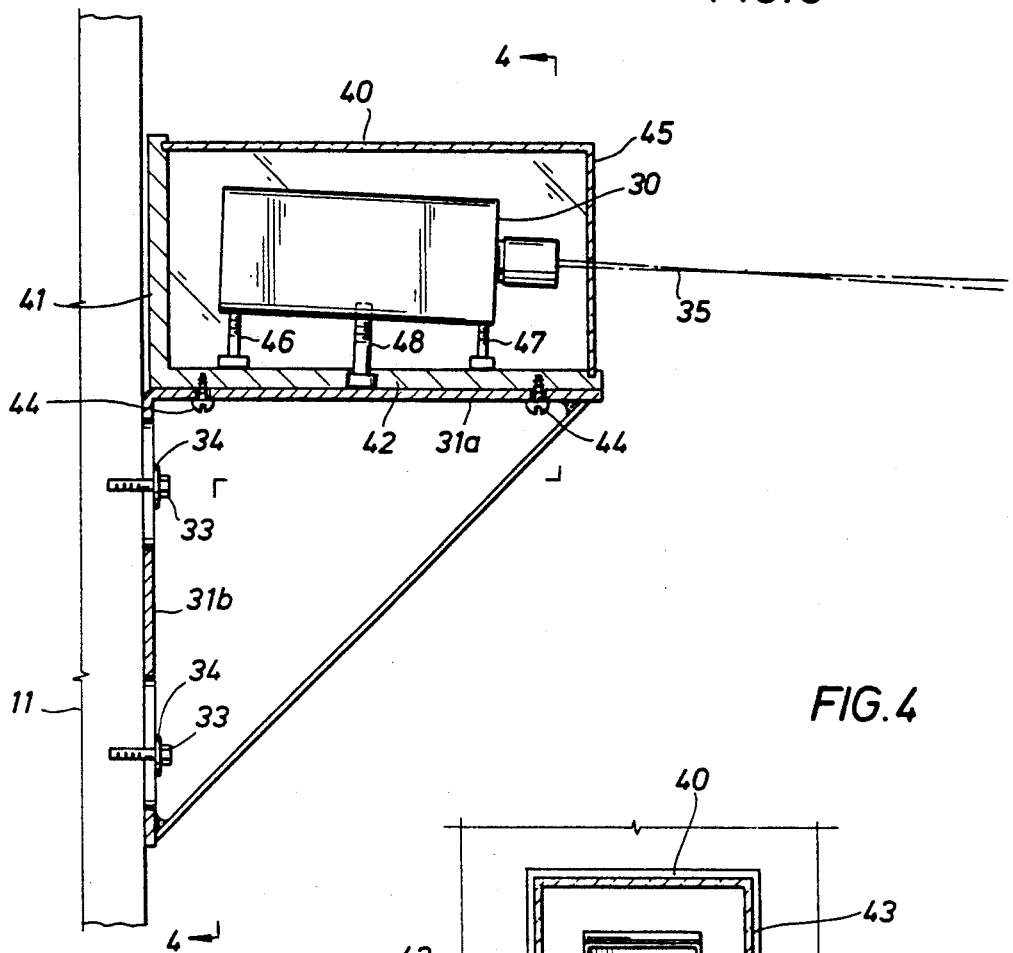
FIG.3
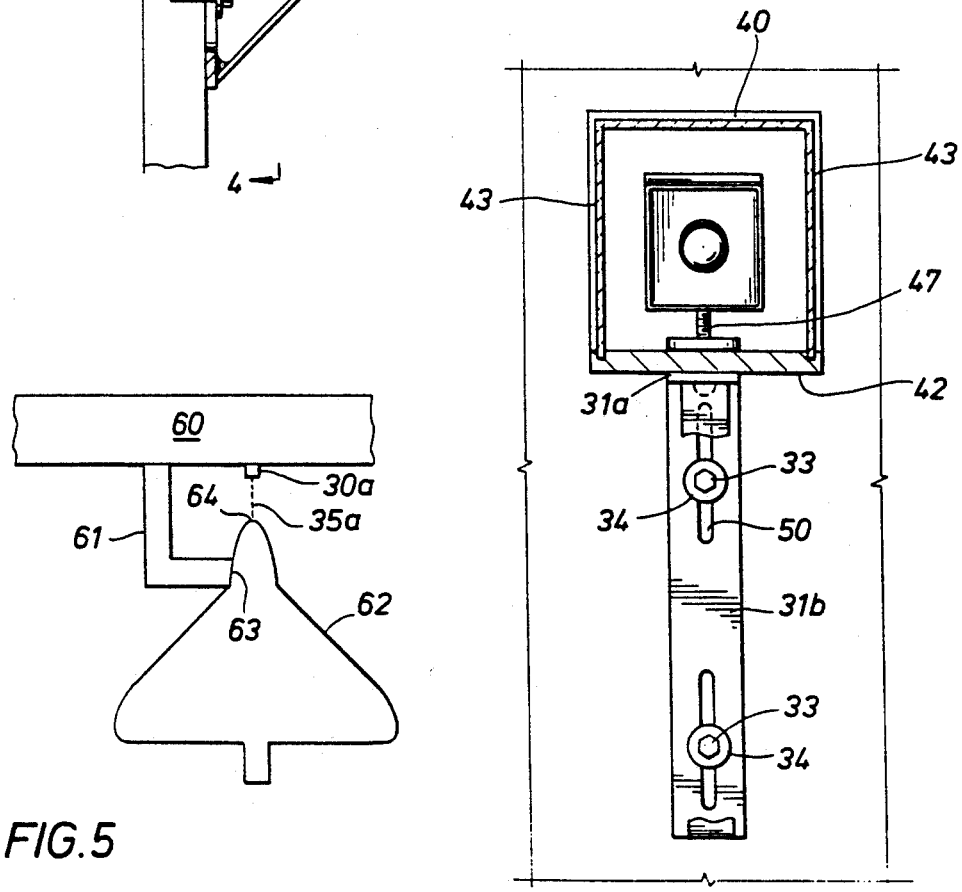
FIG.4
FIG.5

LASER GUIDED VEHICLE POSITIONING SYSTEM AND METHOD

FIELD OF THE INVENTION

The present invention concerns a method and apparatus for guiding a vehicle along a pathway to a predetermined or selected position and, more particularly, the use of a laser beam to furnish such guidance.

BACKGROUND OF THE INVENTION

It is frequently necessary to accurately position a vehicle within a confined space. Such a space can be defined not only by a physical structure, such as a garage, but also by distinguishing markings such as buoys, lines painted on pavement and the like. Vehicles which require such precise positioning may include any means of conveying people and/or cargo on land, sea or in the air. Examples of situations in which the accurate positioning of a vehicle may be desired include the garaging of a car, the positioning of a tractor trailer truck at a loading dock, the docking of a boat at a slip, and the positioning of an airplane at a passenger and/or baggage terminal. In all of these cases, along with similar cases too numerous to mention, an operator must accurately guide the vehicle along a pathway, bringing it to a defined position in relationship to surrounding stationary structures, enclosures, or spaces.

It is not uncommon for damage to occur to the vehicle and/or surrounding structures during the positioning process. For example, in parking a vehicle in a garage whose entrance is only slightly wider than the vehicle, contact of the vehicle's sides with the garage entrance is a more than likely occurrence which could result in damage to both the vehicle and the garage. Moreover, the initial positioning of the vehicle within the enclosure or space may be unsatisfactory. If this is the case, the positioning operation may have to be repeated, thereby leading to the possibility that damage will occur during repositioning. Alternatively, if repositioning is not performed, other consequential problems, such as difficulty in unloading cargo, frequently arise. These and other problems inherent in vehicular positioning operations are well recognized, and various devices and techniques have been envisioned or devised to overcome such problems.

A common technique used to assist in the positioning of a vehicle is the erection of physical barriers (bollards) or bumpers which contact the vehicle as it deviates from the desired path. Such existing devices and techniques have two major drawbacks. First, they do not assist in guiding the vehicle to the correct position. On the contrary, actual impact is the first indication the vehicle operator has that the position of the vehicle is unacceptable. Second, the devices may inflict damage on the vehicle and may even be damaged themselves.

Accordingly, it is one of the objects of the present invention to provide a vehicle guidance and positioning system to quickly, accurately, and interactively guide a vehicle, leading it to the exactly desired position. The active guidance precludes the operator from ever allowing the vehicle to deviate from the desired pathway. Moreover, when the final position is obtained, it is correct. As a secondary benefit, the positioning operation is exceptionally fast when compared with currently available options. It is another object of the invention to provide a method for using the vehicle guidance and positioning system.

SUMMARY OF THE INVENTION

In accordance with the invention, it has now been found that a vehicle can be accurately guided along a pathway to an exactly desired position by utilizing a vehicle guidance system which includes a laser capable of emitting a beam of light in the visible light spectrum and a target mounted on the vehicle so that, when the laser is operational, the emitted light beam impinges on the target and the resultant impingement is observable by the vehicle operator. The laser is typically mounted on a support located apart from the vehicle and positioned in such a manner that the emitted beam of light is directed in the line or path along which the vehicle is to be guided and impinges, usually without being reflected toward the laser, on the target continuously from the time precise guidance of the vehicle is desired until the final position is reached. The laser is normally adjustable to vary the horizontal and vertical directions of the laser beam to adjust for varying positions of the target and, in most cases, to ensure that the laser beam slopes slightly downward in relation to the surface on which the vehicle is moving. Devices for automatically turning the laser on and off and/or positioning the laser may also be employed.

The invention also encompasses the method for guiding the vehicle along the selected path established by the laser beam extending from the laser to the target on the vehicle, which target is observable by the operator of the vehicle; the operator steering the vehicle to maintain the laser beam's impingement on the target from the time guidance of the vehicle begins until the desired position is reached.

BRIEF DESCRIPTION OF THE DRAWINGS

FIG. 3 is an enlarged side view of the laser mounting shown in FIGS. 1 and 2;

FIG. 4 is a view taken on lines 4—4 of FIG. 3; and

FIG. 5 is a top view of an aircraft docking guidance system in accordance with the invention.

DETAILED DESCRIPTION OF THE INVENTION

Figure 1:
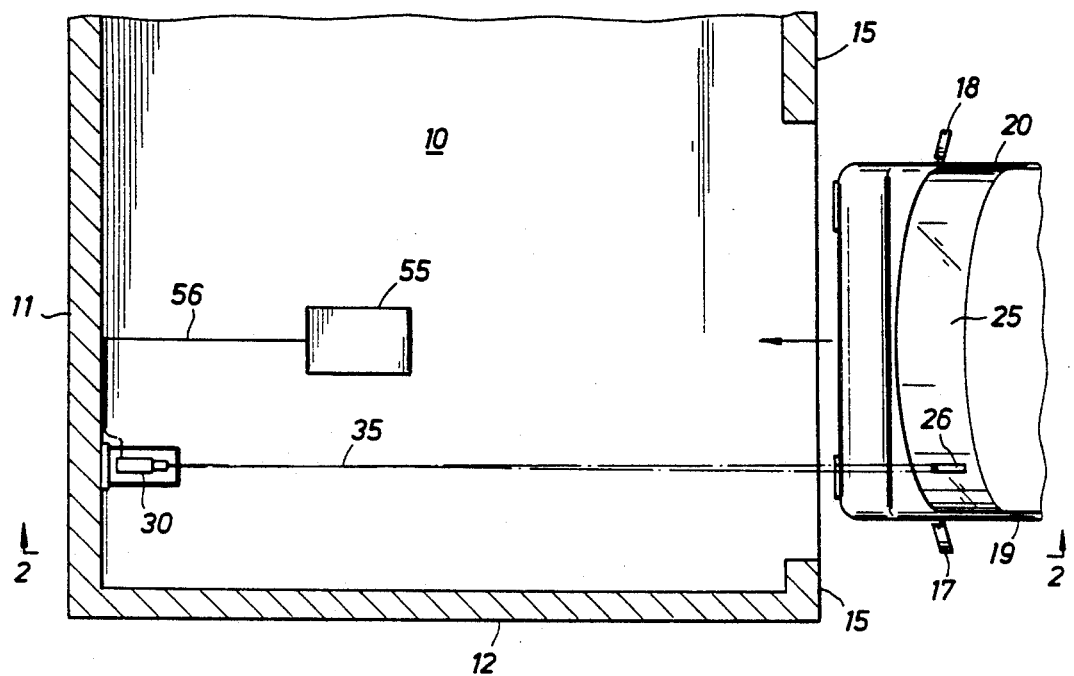
FIG. 1 is a top view of a restricted space into which a vehicle is to be guided in accordance with the invention.
Figure 2:
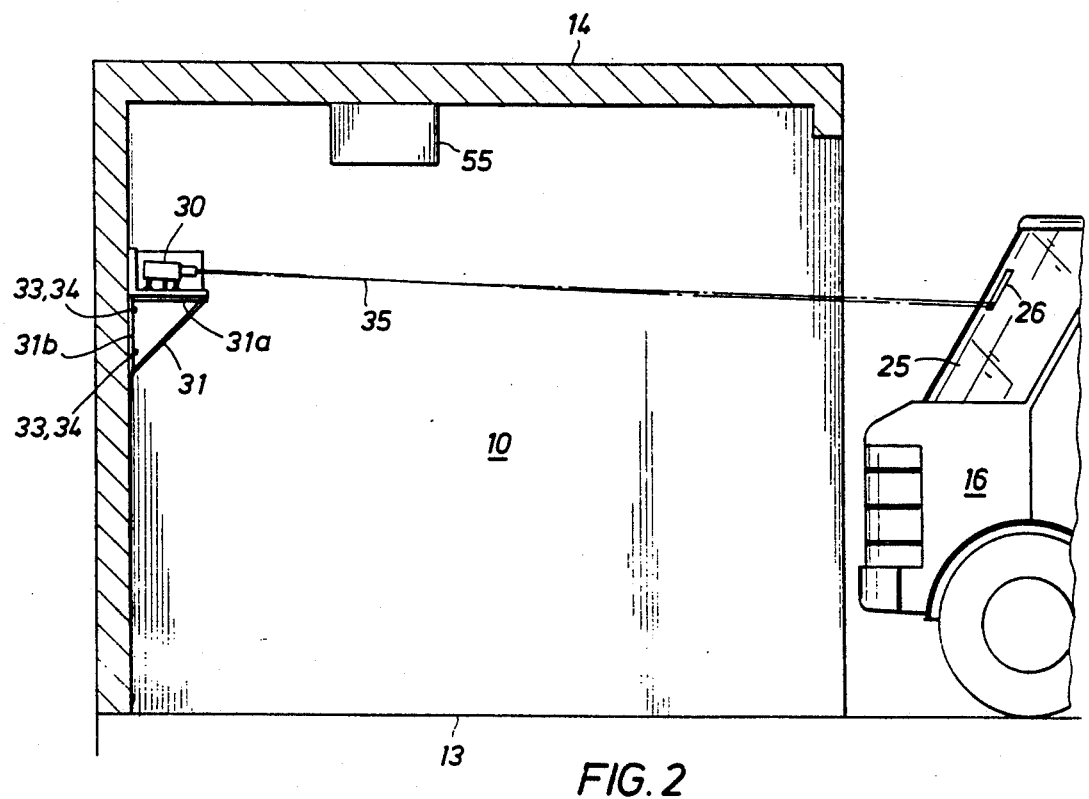
FIG. 2 is an elevation view taken on lines 2—2 of FIG. 1.

Referring to FIGS. 1 and 2, there is shown a confined space 10, such as a residential garage, surrounded by a rear wall 11, a side wall 12, a floor member 13, a top wall 14 and front wall portions 15. A vehicle 16, such as a van, having side mirrors 17 and 18 on sides 19 and 20, respectively, and a windshield 25 having a clearly marked target area, exemplified by the rectangular configuration 26 outlined on the windshield, is located outside space 10.

Preferably, a low power laser device 30 is mounted on a bracket 31 having a horizontal extension member 31a and a vertical extension member 31b secured to rear wall 11 by two sets of bolts and washers 33 and 34 (see also FIGS. 3 and 4). Laser 30 emits a light beam 35 that preferably impinges near the bottom of target area 26 on windshield 25 when vehicle 16 is located just outside the entrance to confined space 10 and near the top of the target area when the vehicle is positioned as desired in the confined space.

As seen in greater detail in FIGS. 3 and 4, laser 30 is encased in a box-like structure having a top side 40, a back side 41, a bottom side 42 that is secured to horizontal extension member 31a by means of screws 44, vertical sides 43 and front side 45. Two threaded members 46 and 47 function to adjust the vertical and horizontal or lateral direction, respectively, of laser 30 and its beam 35 and to support laser 30 on top of bottom side 42. A third threaded member 48 supports laser 30 on horizontal extension member 31a. Vertical extension 31b contains slots 50 through which bolts and washers 33 and 34 secure vertical extension member 31b to rear wall 11 to permit vertical adjustment of bracket 31.

FIGS. 1 and 2 also depict an off/on switch mechanism 55 affixed to top wall 14 of space 10 for turning laser 30 off and on through the wire connection 56 to laser 30. Mechanism 55 may also function to operate garage doors in a conventional manner. Of course, the switch mechanism may be manually operated, also in any conventional manner.

In operating the guidance and positioning system, vehicle 16, which is to be guided into and positioned within space 10, is located just outside the entrance to the space such that mirrors 17 and 18 clear wall sections 15 as shown in FIGS. 1 and 2, and the vertical and lateral positions of laser 30 are adjusted to cause light beam 35 to impinge on target 26, preferably near the lower end of the target. When it is desired to park vehicle 16 in space 10, laser 30 is turned on and the vehicle's operator steers the vehicle into space 10 while maintaining beam 35 on target 26 until the beam reaches the top of the target, or some point near the top, which indicates that vehicle 16 has reached the desired or selected parked position within space 10. Of course, this exact point on the target must be predetermined prior to using the guidance system on a regular basis. This can be done by initially parking the vehicle at the desired position in the space and adjusting the position of the laser and/or the target so that the beam impinges the target at a preselected point. When it is desired to back vehicle 16 from its parked position in space 10, laser 30 is turned on, which places beam 35 at the preselected point on the upper portion of target 26, and the operator backs vehicle 16 out of space 10 by maintaining beam 35 on target 26 until the beam reaches the lower end of the target. As is shown in FIG. 2, laser beam 35 is not quite parallel to floor 13 of space 10, but slopes slightly downward, preferably between about 1 and 25 degrees and more preferably between about 3 and 10 degrees, in relation to the floor. This slightly downward sloping path is the reason the laser beam moves upward on target 26 as vehicle 16 is guided to the desired position within space 10.

The invention is not limited to the use of any particular laser so long as the laser emits in the visible light spectrum at intensities and wave lengths not damaging to the human eye. As noted above, the mounting for the laser is adjustable which enables the direction of the laser beam to be easily changed so that the apparatus and method of the invention can accommodate vehicles of various sizes and shapes or be used for guidance and positioning in many different situations. The position of the laser may be manually or automatically adjusted by use of servo-motor drives on location or remotely driven. Also, the laser may be locked in the desired position. In addition, an optical system, such as the mechanism used with a slide projector "auto-focus" system, may be used to focus the laser beam, especially when the beam must traverse a relatively long guidance path. The optical system may otherwise adjust or optically alter the laser beam to further aid precision of vehicle guidance and positioning.

As previously mentioned, the laser on/off switching may be tied to other apparatus such as a garage door opener and may be manually or automatically operated, optically or electronically. If desired, however, the laser may remain on at all times. Although, in the embodiment of the invention illustrated above, a full laser beam is transmitted directly from the laser to the target to form the guidance path for the vehicle, such guideline or path may be formed by a full or a split laser beam, and/or a focused full or split laser beam. Other optical alterations or modifications to the laser beam to achieve particular light configurations are also envisioned.

Laser equipment for use in the apparatus and method of the invention is commercially available. For example, on pages 101, 112 and 115 of the Edmund Scientific Company's "1989 Annual Reference Catalog for Optics, Science and Education" #19N7 (101 E. Gloucester Pike, Barrington, N.J. 08007-1380 U.S.A.) suitable laser positioning equipment, lasers and laser focusing and beam splitting devices, respectively, for use in the invention are described. This catalog is hereby incorporated by reference in its entirety.

The target area may be other than that shown and described above. For example, a marking device such as a crosshair may provide a target for the laser beam. The target area may be located in any convenient place on the vehicle so long as it is observable by the operator of the vehicle without otherwise interfering with normal vehicle operation. When a laser is used without an optical system to focus the emitted light beam, the target is normally configured so that the laser beam moves up or down the target from one point to another as the vehicle is being guided from one position to another. On the other hand, when an optical focusing system is used with the laser, the target can be a single point on which the laser beam continuously impinges during guidance and positioning and comes into complete focus only when the vehicle reaches its final desired position.

In the embodiment of the invention shown in FIGS. 1 through 4, the apparatus of the invention is used to guide a van into a garage and then to a desired parked position within the garage. It will be understood, however, that the invention is not restricted to the guidance and positioning of any particular type of vehicle in any particular type of confined space. For example, the invention can be used to dock a boat, park a car or truck, guide vehicles through lanes at highway toll booths, banks and fast food restaurants, and the like. FIG. 5 illustrates the application of the invention to the guidance and positioning of an aircraft. As shown in the figure, aircraft 62 has been guided by a laser 30a mounted on passenger terminal 60 to a loading/unloading ramp 61 attached to the terminal. Laser 30a directs a beam 35a onto a target area on the aircraft's windshield, indicated at 64. By sighting beam 35a through the windshield and maintaining it on the target area, the pilot guides aircraft 62 to its desired park position with a door of the aircraft, indicated at 63, next to ramp 61. When leaving the terminal, the aircraft is backed out of the park position using the same method, i.e., by the pilot maintaining beam 35a on the target area. The laser mounting may be motorized and computer controlled to automatically adjust for different types of aircraft.

The invention can be made more elaborate if desired. The laser may be mounted on a computer controlled motorized carriage capable of storing information about each type of vehicle to be guided. For example, in the case of docking an aircraft, the invention could bring the aircraft to an exact location and "trigger" the passenger ramp to move into position. Also, distance sensing could be incorporated into the system to provide two dimensional control of the laser. In addition, a standardized windshield target location could be uniformly applied to all vehicles during manufacturing.

The apparatus of the invention differs from prior art devices in that it is simple, easy to use and designed for dynamic, constantly changing application. The system provides active and immediate feedback to the operator of the vehicle which results in precise guidance and positioning of the vehicle in a confined space without subjecting the vehicle or nearby structures to potential damage.

Although the invention has been primarily described in conjunction with a preferred embodiment, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A guidance and positioning system for use in guiding a vehicle having a windshield to a selected position in a confined space which system comprises:
    (a) a laser capable of emitting a beam of light in the visible light spectrum when in operation, said laser mounted on a stationary support located apart from said vehicle such that, when said laser is in operation, said laser beam is directed between about 1° and about 25° downwardly from a path parallel to the surface over which said vehicle is guided; and
    (b) target means on the windshield of said vehicle upon which said laser beam impinges when said laser is in operation and said vehicle is positioned to enter said confined space, wherein said target means is located on said windshield such that (1) said beam continuously impinges on said target means for a period of time from just before vehicle enters said confined space until said vehicle reaches said selected position and (2) the continuous impingement of said beam is observable by the operator of said vehicle during said period of time.

2. A system as defined by claim 1 further comprising means associated with said laser capable of adjusting the position of said laser beam in selected horizontal and vertical directions.

3. A system as defined by claim 1 wherein said laser beam moves up or down on said target during said continuous impingement.

4. A system as defined by claim 1 further comprising means for turning said laser on and off.

5. A system as defined by claim 1 further comprising optical means for focusing said laser beam.

6. A system as defined by claim 1 wherein said vehicle is a van.

7. A system as defined by claim 1 wherein said vehicle is an airplane.

8. A system as defined by claim 1 wherein said confined space is a garage.

9. A system as defined by claim 1 wherein said confined space is a drive-through service lane.

10. A system as defined by claim 1 wherein said vehicle is selected from the group consisting of an automobile, a boat and a truck.

11. A method for guiding a vehicle having a windshield to a selected position in a confined space which method comprises:
    (a) directing a laser beam from a stationary source between about 1° and about 25° downwardly from a path parallel to the surface over which said vehicle is to be guided such that said laser beam continuously impinges on a target area located on said windshield for a period of time from just before said vehicle enters said confined space until said vehicle reaches said selected position; and
    (b) steering said vehicle along said surface by maintaining the impingement of said laser beam on said target area until said vehicle arrives at said selected position.

12. A method as defined by claim 11 wherein the direction of said laser beam is adjusted before said beam impinges upon said target area.

13. A method as defined by claim 11 wherein said laser beam moves up or down on said target area to a predetermined point indicative of said selected position.

14. A method as defined by claim 11 wherein said laser beam is focused by the use of optical means.

15. A method as defined by claim 11 wherein said laser beam is a split laser beam.

16. A method as defined by claim 11 wherein said vehicle is an automobile.

17. A method as defined by claim 11 wherein said vehicle is selected from the group consisting of a van, a boat, a truck and an airplane.

18. A method as defined by claim 11 wherein said confined space is a garage.

19. A guidance and positioning system for use in guiding a vehicle to a selected position in a confined space which system comprises:
    (a) a laser capable of emitting a beam of light in the visible light spectrum when in operation, said laser mounted on a support located ahead of said vehicle such that, when said laser is in operation, said laser beam is directed between about 1° and about 25° downwardly from a path parallel to the surface over which said vehicle is guided; and
    (b) target means on said vehicle upon which said laser beam impinges when said laser is in operation and said vehicle is positioned to enter said confined space, wherein said target means is located on said vehicle such that (1) said beam continuously impinges on said target means for a period of time from just before said vehicle enters said confined space until said vehicle reaches said selected position and (2) the continuous impingement of said beam is observable by the operator of said vehicle during said period of time.

20. A system as defined by claim 19 wherein said vehicle is selected from the group consisting of an automobile, a van, an airplane, a boat and a truck.

21. A system as defined by claim 20 wherein said vehicle has a windshield and said target means is located on said windshield.

22. A system as defined by claim 19 wherein said confined space is a garage.

23. A method for guiding a vehicle to a selected position in a confined space which method comprises:

(a) directing a laser beam from a position in front of said vehicle between about 1° and about 25° downwardly from a path parallel to the surface over which said vehicle is to be guided such that said laser beam continuously impinges on a target area located on said vehicle for a period of time from just before said vehicle enters said confined space until said vehicle reaches said selected position; and (b) steering said vehicle along said surface by maintaining the impingement of said laser beam on said target area until said vehicle arrives at said selected position.

24. A method as defined by claim 23 wherein said vehicle is selected from the group consisting of an automobile, a van, a boat, an airplane and a truck.

25. A method as defined by claim 23 wherein said vehicle has a windshield and said target means is located on said windshield.